(12) United States Patent
Smith

(10) Patent No.: US 6,237,324 B1
(45) Date of Patent: May 29, 2001

(54) FUEL CONTROL SYSTEM FOR A GAS TURBINE ENGINE

(75) Inventor: Trevor S Smith, Sutton Coldfield (GB)

(73) Assignee: Lucas Industries Public Limited Company, Solihull (GB)

(\*) Notice: Subject to any disclaimer, the term of this patent is extended or adjusted under 35 U.S.C. 154(b) by 0 days.

(21) Appl. No.: 09/096,273

(22) Filed: Jun. 11, 1998

(30) Foreign Application Priority Data

Jun. 20, 1997 (GB) .................................................. 9712947

(51) Int. Cl.$^7$ ...................................................... F02C 9/26
(52) U.S. Cl. ............................................ 60/39.281; 60/734
(58) Field of Search ............................ 60/39.091, 39.281, 60/734

(56) References Cited

U.S. PATENT DOCUMENTS 4,969,444 \* 11/1990 Zagranski et al. ...................... 60/734

FOREIGN PATENT DOCUMENTS

| 0 436 513 A1 | 1/1991 | (EP) . |
| 0 761 948 A2 | 7/1996 | (EP) . |
| 2 300 451 | 11/1996 | (GB) . |

\* cited by examiner

Primary Examiner—Louis J. Casaregola
(74) Attorney, Agent, or Firm—Andrus, Sceales, Starke & Sawall, LLP

(57) ABSTRACT

A fuel control system for a gas turbine engine includes series-connected first and second metering valves for providing a metered fuel flow to an engine supply line. A downward failure condition in either valve is detected by a detector which produces a signal representative of such failure. A changeover device operates in response to the failure signal to place the system in a condition in which a sufficient metered fuel flow is maintained via the non-failed valve.

3 Claims, 2 Drawing Sheets

FUEL CONTROL SYSTEM FOR A GAS TURBINE ENGINE

This invention relates to a fuel control system for a gas turbine engine, such as a jet engine, primarily for use in aircraft.

Fuel control systems have been proposed incorporating main and emergency fuel metering valves connected in series and arranged so that failure of one of the valves in a manner giving rise to potential upward runaway of fuel flow results in control being maintained or assumed by the other valve.

It can be desirable to provide a fuel control system with protection against a condition leading to downward failure of either valve and an object of the invention is to provide a fuel control system in which this is accomplished in a simple and efficient manner. In this specification, "downward failure" of a valve means failure in such a manner as to cause a potential reduction in fuel flow.

According to the present invention, a fuel control system comprises series-connected first and second metering valves for providing a metered fuel flow, means operable to detect a downward failure condition in the control or operation of either metering valve and to produce a signal representative of such failure, and means operable in response to said signal to place the system in a condition in which a sufficient metered fuel flow is maintained via the non-failed valve.

The first and second metering valves conveniently have respectively main and emergency functions with the metered flow normally provided by the main valve, said signal-responsive means being operable to transfer fuel supply control to the non-failed emergency valve upon downward failure of the main valve.

Preferably, the system is placed in said condition either by by-passing the failed valve or by placing the failed valve in an open condition such that a sufficient amount of fuel is supplied therethrough.

Preferably, the means operable in response to said signal is a changeover valve.

Typically, the system includes means serving to monitor position error signals from the valves and to cause operation of the signal-responsive means, upon the occurrence of an error signal in excess of a predetermined value, to place the system in said condition.

An arrangement can thus be envisaged in which downward failure of one of the valves will not lead to an undemanded reduction in fuel flow since the failed valve is rapidly placed in a condition in which supply control can be taken over or retained by the non-failed valve.

In one typical arrangement, one of the metering valves disposed downstream of the other is controlled to provide a fuel supply rate higher than the other valve, as described in our published application EP 0761948, enabling either valve to retain or assume control upon upward failure of the other. The system may thus be protected additionally against upward valve failure.

Figure 1:
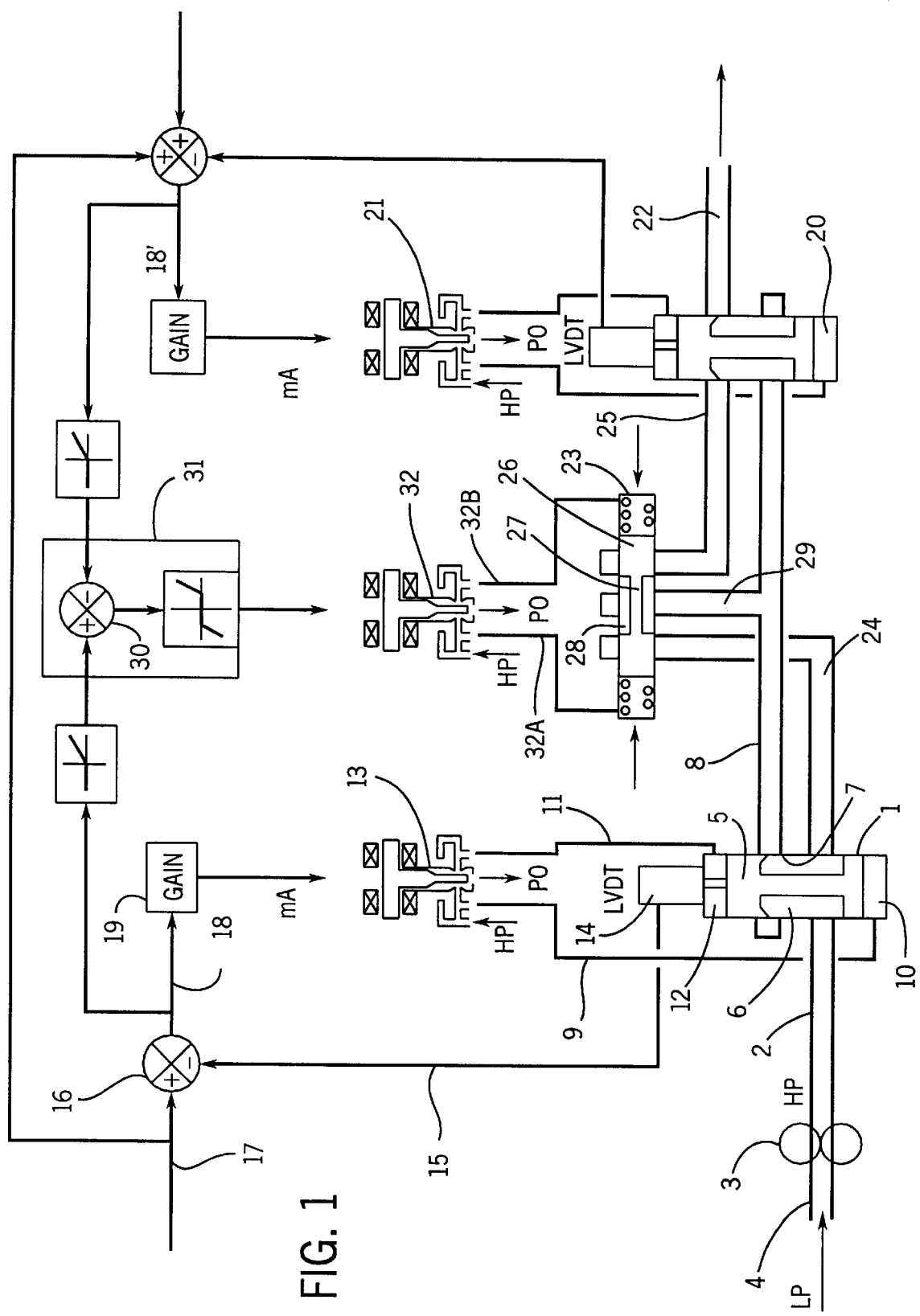
Figure 2:
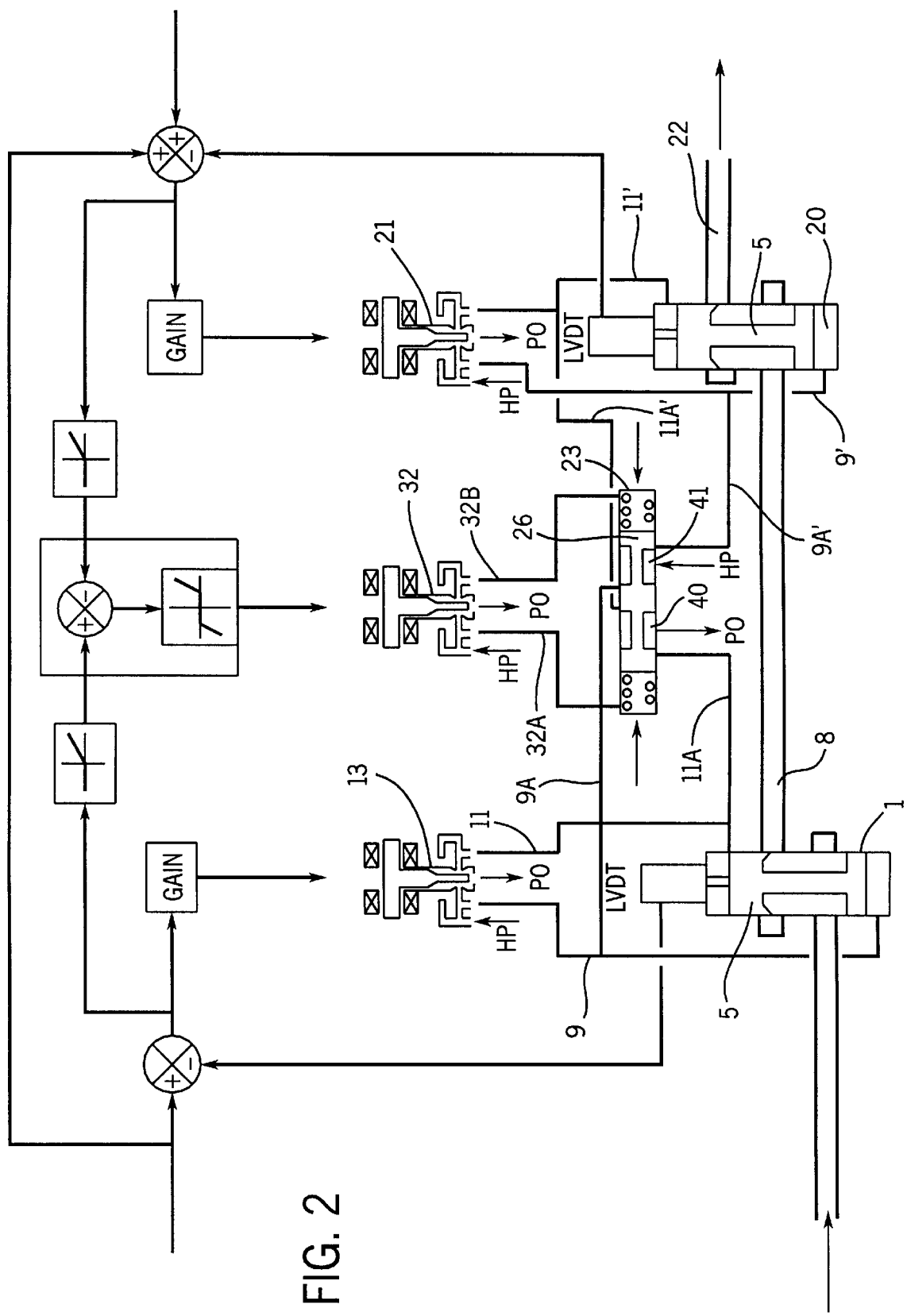

The invention will now be described, by way of example, with reference to the accompanying drawings in which:

FIG 1 is a diagrammatic representation of one embodiment of the fuel control system of the invention; and FIG. 2 is a view similar to FIG. 1 of a second embodiment of the fuel control system of the invention.

In the system of the invention, a main metering valve 1 is supplied with high pressure fuel from a line 2, which pressure is derived from a pump 3 supplied by a low pressure line 4. The valve 1 has a valve member 5 which controls the flow of high pressure fluid from an intermediate chamber 6 of the valve through a metering orifice 7 into a flow line 8. A control line 9 is connected to a control chamber 10 at one side of the valve member 5 and a similar control line 11 is connected to a control chamber 12 at the opposite side of the valve member. The position of the valve member 5 is controlled by a main metering torque motor 13 which supplies flow from high pressure into the control lines 9 and 11 via fixed restrictors and varies flow out of control lines 9 and 11 via variable restrictors. The position of the valve member 5 is monitored by a linear variable differential transformer 14 from which a signal representative of the valve member position is fed along an output line 15 to a comparator or similar device 16. This device also receives, via line 17, a signal representative of the desired valve element position and an error signal is provided via line 18 which, after amplification at 19, is fed to the main metering torque motor 13 operating to control the position of the valve member 5 in a continuous manner, as mentioned above.

The metered output from the metering orifice 7 of the valve 1 is supplied via the line 8 to a second metering valve 20, referred to as an emergency metering valve, which is arranged in similar manner to the valve 1 and controlled by a torque motor 21 to provide for a metered flow which is higher by say 20%, than that provided by the main metering valve into an engine supply line 22. This arrangement of main and emergency metering valves, referred to as a "low win" arrangement provides automatic and immediate protection against upward failure of either of the valves 1 and 20, or their respective torque motors. This is because, in the event of upward failure of the main metering valve, i.e. such as would cause an untoward increase in fuel flow from the valve, the emergency metering valve will assume control of the fuel supply to line 22, albeit at the slightly higher than required rate, which can be rapidly brought under control to supply the desired fuel flow. On the other hand, should the emergency metering valve fail upwardly, the main metering valve will continue to operate without hindrance from the emergency valve, to maintain the required flow to the engine via line 22.

As system of this kind is described in detail in our published application EP 0761948.

In order to protect against downward failure of either torque motor and/or downward failure or seizure of either of the valves 1, 20, it is necessary to detect the failure and to place the system in a condition such that any controlling influence is removed from the failed valve, whilst ensuring that only the non-failed valve assumes or retains control. This is achieved, in the present embodiment, by the use of a changeover valve 23 to which high pressure non-metered fuel is supplied via a line 24. A high pressure fuel outlet line 25 is provided between the changeover valve and emergency metering valve and a spring-loaded spool 26, normally spring-urged into an illustrated intermediate position, blocks both of the lines 24, 25 at the valve, when in this position. A reduced diameter land 27 of the valve creates an internal annular chamber 28, to which is connected a branch line 29 of the high pressure line 8.

In order to detect downward failure of either valve and/or its associated torque motor, position error signals for the two valves tapped from the respective lines 18, 18' are fed to a summing junction 30 at a downward failure detector 31, where any positive emergency metering valve position error signal, representing excessive closure of this valve, is subtracted from any corresponding positive position error signal from the main metering valve. The output from this summing junction is passed through a dead space and then applied to drive a changeover torque motor 32 controlling the changeover valve 23. If the main metering valve position is closed further than demanded by more than a predetermined amount, which means that the fuel supply through this valve will be less than the demanded flow, a positive output is provided at the dead space which energises the changeover torque motor to apply high pressure through the line 32B, thereby moving the valve spool 26 to the left, as seen in the drawing, i.e. to the emergency metering valve only position. The effect of this is to connect the auxiliary high pressure line 24 to the space 28 and thence via the branch line 29 into the right hand portion of the line 8, whence the high pressure fuel is supplied directly to the valve 20, by-passing the valve 1, for metering and discharge through the engine supply line 22.

Similarly, if the position of the valve member in the emergency metering valve 20 is sensed to be further closed than demanded by more than a predetermined amount, and assuming that there is no similar error in the position of the main metering valve, then a negative output is produced from the dead space, energising the changeover torque motor 32 to apply high pressure through the line 32A. This moves the valve spool 26 to the right, connecting the line 8 via the branch 29 and space 28 to the line 25, permitting metered fluid from the main metering valve 1 to be fed directly to the engine supply line 22.

It will be seen that, in the embodiment of FIG. 1, downward failure of one of the valves and/or its controlling motor results in the failed valve being by-passed so that fuel supply is controlled by the non-failed valve.

In the alternative embodiment illustrated in FIG. 2, in which reference numerals of FIG. 1 are used to designate like parts, the changeover valve 23 is modified so that its spool 26 has two reduced diameter lands creating annular spaces 40, 41 connected respectively to low and high pressure regions. Lines 11A and 11A' branched respectively from the lines 11 and 11' are connected to the valve at either side of the annular space 40 and, similarly, lines 9A and 9A' are connected to the valve respectively at either side of the annular space 41, all of the lines 9A, 11A, 9A', and 11A' being blocked by the valve in its illustrated neutral position, to which it is spring-urged. With the valve in this position, the main and emergency metering valves operate in the manner described in connection with FIG. 1, with the emergency valve providing a higher output than the main valve in order to deal with upward failure of the valves.

In the event of downward failure of the main metering valve 1, the changeover valve is energised, in the manner described previously, in order to move it to the left, as seen in the drawing. This has the effect of connecting the line 11A supplying the upper side of the valve member 5 of the main valve 1 to the low pressure space 40, whilst simultaneously connecting the high pressure space 41 to the line 9A, ensuring that high pressure is supplied along the line 9 to the lower end of the valve member 5 to drive it rapidly to a fully open position. This places the system in a condition in which a full flow of high pressure fluid is permitted along line 8, unhindered by the valve 1, to the emergency metering valve 20, where it is metered and discharged at the engine supply line 22. Similarly, in the event of downward failure of the emergency metering valve 20, detection of this failure results in the changeover torque motor moving the spool 26 to the right, as seen in the drawing, connecting the line 11A' and consequently the supply line 11' to the low pressure region 40, whilst simultaneously connecting the line 9A' to the high pressure region 41, ensuring that high pressure is applied to the underside of the valve element 5 of the valve 20, raising it rapidly to its fully open position to enable fuel metered by the main valve 1 to pass unhindered through the valve 20 and into the engine supply line 22.

Any substantial positive position errors arising as a result of rapid increase in flow demand, such as re-slam from a deceleration condition for example, will be present for both metering valves so that subtracting the errors at the summing junction will prevent inadvertent changeover. Alternatively, the changeover signal could be inhibited for sufficient time to allow rapid transient errors to occur without affecting the operation of the system and this may allow the changeover signal to be taken directly from the position errors without comparison at a summing junction. Using only positive position error signals allows automatic reversion to normal control on both metering valves if the fault disappears.

It would be possible to use both positive and negative position errors, but this would result in a small increase in the probability of upward failure remaining uncontrolled, which may be inconsistent with the very low requirement of not more than one uncontrolled upward failure per $10^9$ engine flying hours.

What is claimed is:

1. A fuel control system comprising series-connected first and second metering valves for providing a metered fuel flow, means operable to detect a downward failure condition in the control or operation of either metering valve and to produce a signal representative of such failure, means operable in response to said signal to place the system in a condition in which a sufficient metered fuel flow is maintained via the non-failed valve, and means serving to monitor error signals from the valves and to cause operation of the signal responsive means upon occurrence of an error signal in excess of a predetermined value, to place the system in said condition.

2. The system according to claim 1, wherein a torque motor is energized to place the system in said condition.

3. A fuel control system comprising series-connected first and second metering valves for providing a metered fuel flow, means operable to detect a downward failure condition in the control or operation of either metering valve and to produce a signal representative of such failure, and means operable in response to said signal to place the system in a condition in which a sufficient metered fuel flow is maintained via the non-failed valve, wherein the signal responsive means is a changeover valve and wherein the changeover valve is a spool valve movable by the selective application of high pressure fluid to alternative positions in which the metering valves are permitted respectively to assume the main metering function.

* * * * *